United States Patent [19]

Panaroni et al.

[11] Patent Number: 5,086,815

[45] Date of Patent: Feb. 11, 1992

[54] AIR LESS TIRE WITH CIRCUMFERENTIAL BAND REINFORCEMENT

[76] Inventors: Vincent F. Panaroni, 7 Whatney, Irvine, Calif. 92718; Richard Steinke, 2180 Three Kings Crt., Park City, Utah 84060

[21] Appl. No.: 533,025

[22] Filed: Jun. 4, 1990

[51] Int. Cl.$^5$ .............................. B60C 7/00; B60C 7/14
[52] U.S. Cl. ...................... 152/251; 152/246; 152/323
[58] Field of Search ............... 152/246, 251, 315, 323, 152/267, 268, 247, 324–329, 248–250; 301/252–266, 63 PW

[56] References Cited

U.S. PATENT DOCUMENTS

| | | | |
|---|---|---|---|
| 624,940 | 5/1899 | Huestis | 152/324 |
| 656,172 | 8/1900 | Colt | 152/327 |

FOREIGN PATENT DOCUMENTS

| | | | |
|---|---|---|---|
| 221561 | 9/1924 | United Kingdom . | |
| 1285255 | 8/1972 | United Kingdom | 152/323 |

*Primary Examiner*—Michael W. Ball
*Assistant Examiner*—Adrienne C. Johnstone
*Attorney, Agent, or Firm*—M. Reid Russell

[57] ABSTRACT

An airless tire incorporating a reinforcement chord system that is pre-assembled before placement in a tire mold to provide reinforcement for an airless tire that is formed in that mold and including one or more bands of selective length each formed into a ring with stand-off supports removably attached to each band or to each of the plurality of bands, the stand-off supports including legs or pins that can be formed to desired length appropriate for use in a selected mold.

6 Claims, 1 Drawing Sheet

U.S. Patent     Feb. 11, 1992     5,086,815
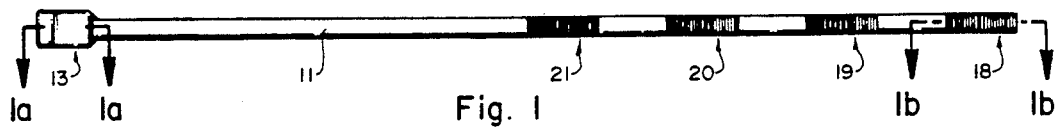
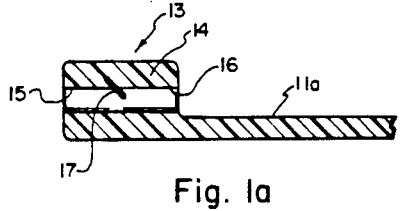
Fig. 1a     Fig. 3     Fig. 1b
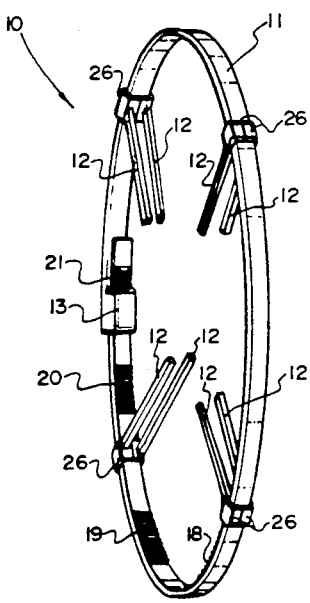
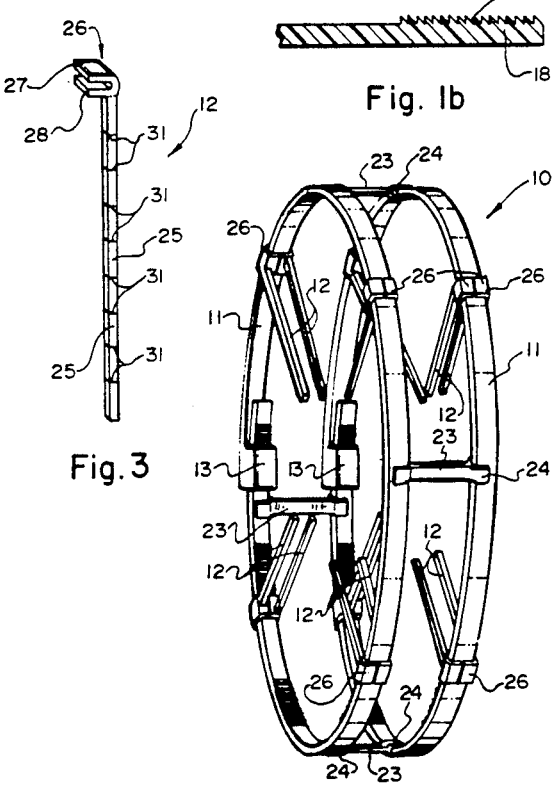
Fig. 4     Fig. 5
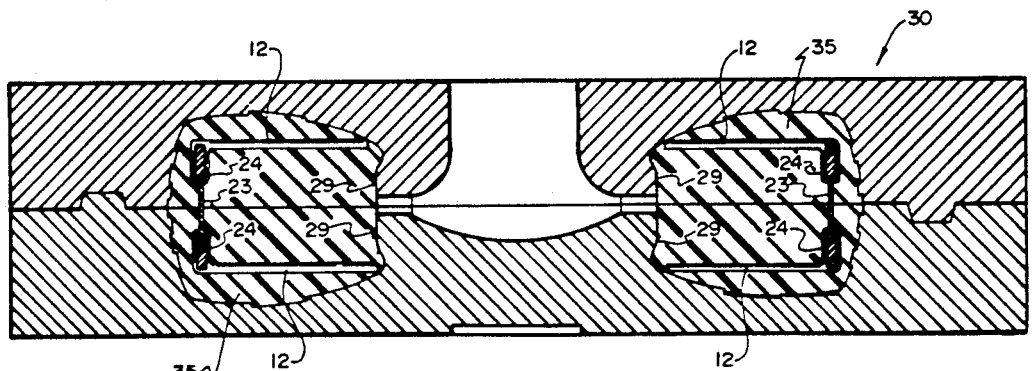
Fig. 6

AIR LESS TIRE WITH CIRCUMFERENTIAL BAND REINFORCEMENT

BACKGROUND OF THE INVENTION

1. Field of the Invention

This invention relates to reinforcement chords and bands placed in vehicle tires as they are formed to strengthen the formed tire.

2. Prior Art

The need for reinforcement chords and bands in vehicle tires has long been recognized. In recent years the reinforcement materials most commonly used have been nylon and steel. However, in the past, a great many other materials have been proposed and used.

In the co-pending application for U.S. Pat. Ser. No. 07/493,345 there is disclosed a chord system particularly adapted for use in airless tires molded of polyurethane foams or polyurethane foam compositions.

OBJECTS OF THE INVENTION

A principal object of the present invention is to provide a chord system for polyurethane airless tires that is adaptable for use with tires of varying sizes.

Another object is to provide a band or chord system that can be pre-built for drop-in installation into a tire mold and that can be positioned within the mold for a polyurethane tire to provide proper location of the reinforcement chords in a tire to effect maximum design strength and wearability of the tire.

FEATURES OF THE INVENTION

Principal features of the invention include one or more bands of pre-stressed reinforcement material such as nylon. Each band is made sufficiently long to provide an encircling reinforcement band to fit in even a maximum diameter tire to be manufactured. The band includes a band locking member arranged at one end, with cooperating band lock members maintained at predetermined lengths along that reinforcement band and at the other end thereof. Break-away grooves are provided that are adjacent to the cooperating band locking members located intermediate the ends of the band. Between adjacent band locking members the band is pre-stressed, as necessary.

Stand-off supports, each comprising an elongate leg or pin and a band attachment device, are arranged to be attached at intervals to the reinforcement band so as to extend therefrom into engagement with a wall of a tire mold. The elongate leg is provided with break-away grooves so that the stand-off support can be used with a formed band, set up for use in any particular size tire mold.

Other objects and features of the invention will become apparent from the following detailed description and drawing disclosing what are presently contemplated as being the best modes of the invention.

THE DRAWINGS

In the drawings:

FIG. 1 is a top plan view of reinforcing band of the present invention;

FIG. 1(a), an enlarged fragmentary section taken on the line 1(a)-1(a) of FIG. 1;

FIG. 1(b), a similar view to FIG. 1(a) taken on line 1(b)-1(b) of FIG. 1;

FIG. 2, a side elevation view of the band of FIG. 1;

FIG. 3, a side elevation view of a preferred stand-off member of the invention;

FIG. 4, a perspective view of an assembled chord system;

FIG. 5, a perspective view of another chord system embodiment incorporating a plurality of bands and spacers between the bands; and FIG. 6, a cross-sectional view of the chord system as shown in FIG. 5, positioned in a tire mold.

DETAILED DESCRIPTION OF THE INVENTION

Referring now to the drawings:

The illustrated preferred embodiment the chord system, shown generally at 10, FIG. 4, includes a band 11 of that is formed of a reinforcement material such as nylon, and includes a plurality of stand-off supports 12.

As shown best in FIGS. 1 through 1(b), the band 11 includes a receiving latch member 13 on one thereof. The receiving latch member includes a housing 14 formed on a top surface 11a of the band at one end thereof that has openings 15 and 16 at opposite housing ends, with a dog 17 mounted therein. The band 11 also includes an insert latch member 18 formed at the other end thereof and additional insert latch members 19-21 are spaced along the length of the band 11 between the receiving latch member 13 at one end of the band and the insert latch member 18 at the other end. Each of the insert latch members include a rack of teeth 22 that are engageable by the dog 17 to secure the insert latch member in the receiving latch member. The distance from the receiving latch member 13 to each insert latch member is determined by the circumference formed when that insert latch member is inserted into the receiving latch member, which circumference is selected, as necessary, to form a reinforcement band of a particular tire to be produced.

With the plurality of insert latch members on the band a single band 11 can be selectively used for one of a number of tire sizes. Thus, if a band 11 is to be used as a reinforcement band for a small sized tire, the band is cut at the side of insert latch member 19 remote from the receiving latch member 13 and that insert latch member 19 is inserted and locked into the receiving latch member so as to form a circular band. Likewise, if a reinforcement band of any other tire size for which band 11 is made is desired the band is cut adjacent the appropriate insert latch member 20 or 21, or is left uncut if the insert latch member 18 is to be used. The insert latch member at the end of the band of desired length is inserted into the receiving latch member to form the circular reinforcement member and is to be molded into an airless tire, as shown in FIG. 6.

It will be apparent that the reinforcement band can be made to be any desired overall length, and may have any desired thickness width or cross-sectional configuration.

The stand-off supports 12 each include a long leg or pin 25 having an attachment clip 26 formed at one end thereof. The clip 26 comprises a pair of closely spaced ears 27 and 28 that will receive the band 11, or a side edge of the band 11 between them. With the clip 26 affixed to the band the leg 25 can extend either outwardly or inwardly with respect to the circular band to engage either the outermost wall or an innermost wall of a tire mold in which the chord system 10 is used.

As shown in FIG. 4, a plurality of supports 12 are attached at spaced intervals to bands 11 and extend inwardly of the circular band to engage the innermost wall 29 of a tire mold 30, as shown in FIG. 6. Shown best in FIG. 3, the leg 25 of each stand-off support has a series of spaced apart break-away grooves 31 formed therearound. The grooves 31 are spaced to provide a proper leg length, when broken on a groove 31, insuring correct placement of the chord system in a mold during formation of a tire in that mold.

As shown best in FIGS. 5 and 6, a plurality of bands 11 can be interconnected by spacers 23 with bifurcated clips 24 on opposite ends thereof, the bifurcated clips to fit over the band 11 edge. Stand-off supports 12 are interconnected to the outermost edges of each of a pair of connected bands 11, and, as previously described, are shown pointing inwardly to engage the innermost or outermost wall of the mold 30. After the chord system 10 has been formed it is merely positioned in the mold 30 and an airless tire 35, as shown in FIG. 6, is formed with the chord system embedded therein. The tire may be formed, for example, as disclosed in my co-pending application for U.S. Pat. Ser. No. 07/493,345.

Although a preferred form of our invention has been herein disclosed, it is to be understood that the present disclosure is by way of example and that variations are possible without departing from the subject matter coming within the scope of the following claims and a reasonable equivalency thereof, which subject matter we regard as our invention.

We claim:

1. An airless tire comprising, a foamed polyurethane material formed into an airless tire; at least one band of reinforcement material for arrangement within said airless tire formed into a ring; means for adjusting the circumference of said ring; and a plurality of stand-off support means arranged for coupling at spaced intervals along said band and including leg means for projecting therefrom to either the radially outermost or radially innermost surface of the foamed polyurethane material.

2. An airless tire as in claim 1, including a plurality of bands of reinforcement materials each formed into rings that are interconnected by spacers that are mounted at spaced intervals around the rings.

3. An airless tire as in claim 1, wherein the support means consist of a clip for coupling to the band wherefrom at least one elongate leg projects at a right angle.

4. An airless tire as in claim 3, where two parallel elongate legs project from each clip surface.

5. An airless tire as in claim 1, wherein the means for adjusting the circumference of said ring consists of, a receiving latch member secured on one band end that has an opening therethrough wherein is arranged a dog, said opening for receiving the opposite band end that includes a latch member arranged thereacross, the latch member to slide over the dog as the band end is fitted therein, shortening the ring circumference, and locks to that dog to secure band ends.

6. An airless tire as in claim 5, wherein the latch member consists of a rack of teeth; and the dog is a ratcheting dog for traveling over said rack of teeth in one direction of travel and will bind thereto when an attempt is made to move the rack of teeth oppositely.

* * * * *